(12) United States Patent
Araki et al.

(10) Patent No.: US 10,928,665 B2
(45) Date of Patent: Feb. 23, 2021

(54) DISPLAY DEVICE

(71) Applicant: SHARP KABUSHIKI KAISHA, Sakai (JP)

(72) Inventors: Ryoh Araki, Sakai (JP); Hikaru Kuki, Sakai (JP); Tsuyoshi Kawaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/468,871

(22) PCT Filed: Dec. 11, 2017

(86) PCT No.: PCT/JP2017/044359
§ 371 (c)(1),
(2) Date: Jun. 12, 2019

(87) PCT Pub. No.: WO2018/110496
PCT Pub. Date: Jun. 21, 2018

(65) Prior Publication Data
US 2020/0081285 A1 Mar. 12, 2020

(30) Foreign Application Priority Data
Dec. 16, 2016 (JP) .............................. JP2016-244903

(51) Int. Cl.
*G02F 1/1333* (2006.01)
*G02F 1/00* (2006.01)
*G06F 3/041* (2006.01)

(52) U.S. Cl.
CPC ........ *G02F 1/13338* (2013.01); *G02F 1/0045* (2013.01); *G02F 1/133305* (2013.01); *G06F 3/0412* (2013.01)

(58) Field of Classification Search
None
See application file for complete search history.

(56) References Cited

U.S. PATENT DOCUMENTS

| 2008/0068520 | A1 | 3/2008 | Minikey, Jr. et al. |
| 2008/0218369 | A1* | 9/2008 | Krans ................. H01L 51/0097 340/691.1 |
| 2015/0034918 | A1* | 2/2015 | Yim ....................... H01L 51/56 257/40 |
| 2016/0056415 | A1* | 2/2016 | Yoo ..................... H01L 51/5281 349/43 |

FOREIGN PATENT DOCUMENTS

| JP | 2005-122101 A | 5/2005 |
| JP | 2009-529452 A | 8/2009 |
| JP | 2016-194019 A | 11/2016 |

* cited by examiner

*Primary Examiner* — Ifedayo B Iluyomade
(74) *Attorney, Agent, or Firm* — ScienBiziP, P.C.

(57) ABSTRACT

Provided is a technique allowing a screen of a display device to be harmonized with a housing of the display device or an environment surrounding the display device, while an image is not displayed. A display device (1) includes: a display section (2) which displays an image; and a background section (3) which is provided on a front surface side of the display section (2), the background section (3) having a plurality of openings (4) through which light, emitted from the display section (2) for display of the image, passes.

13 Claims, 4 Drawing Sheets

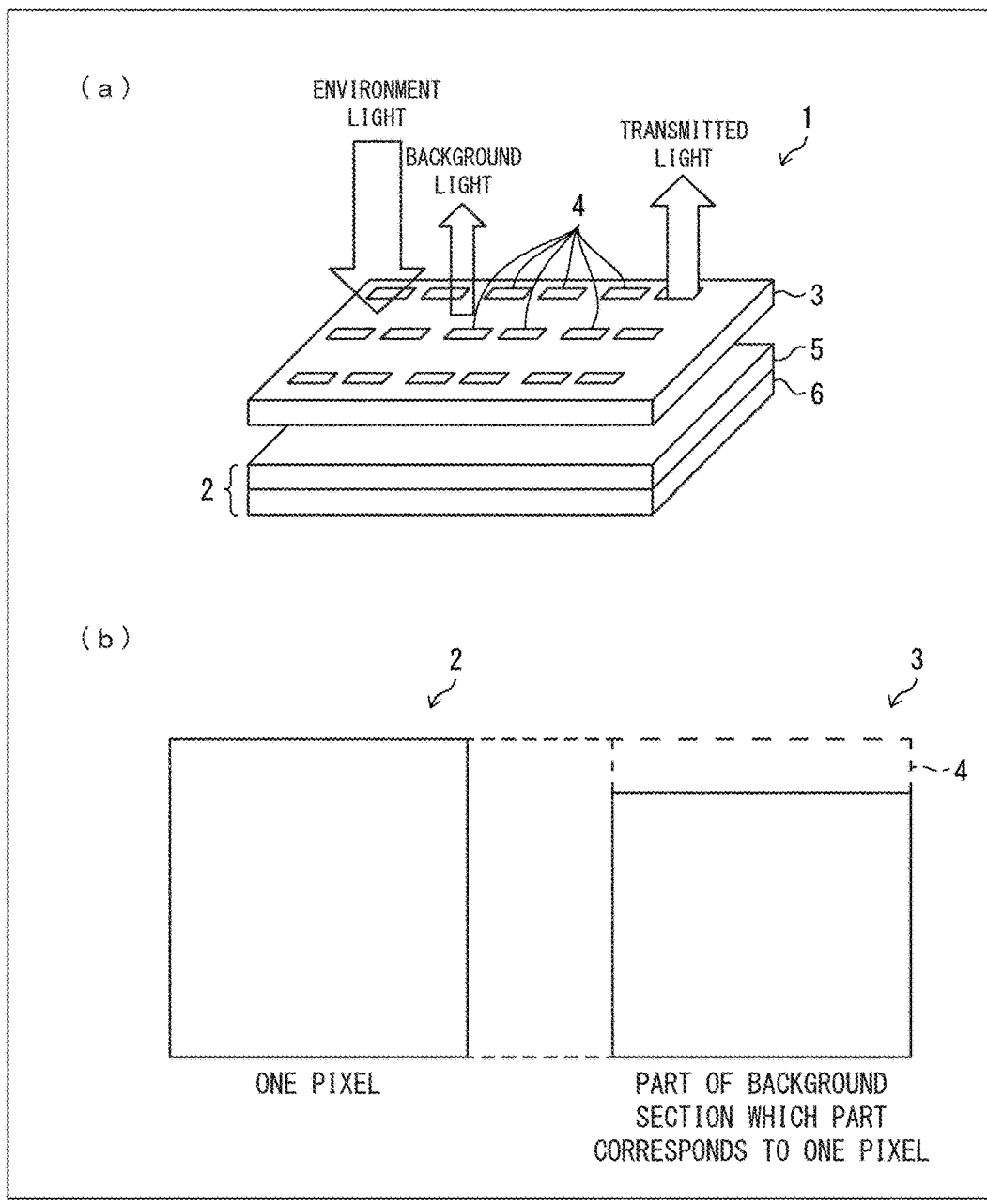

| BRIGHTNESS VALUE OF DISPLAY SECTION (cd/m2) | BRIGHTNESS VALUE OF SURFACE OF BACKGROUND SECTION (DECORATED FILM) | | | | |
|---|---|---|---|---|---|
| | NO DECORATED FILM | MARBLE | WOOD-GRAIN (YELLOW) | WOOD-GRAIN (BROWN) | METAL HAIRLINE |
| 0 | 68 | 168 | 163 | 93 | 66 |
| 500 | 500 | 190 | 192 | 120 | 106 |
| 1,000 | 1,000 | 280 | 270 | 185 | 170 |
| 2,000 | 2,000 | 400 | 450 | 290 | 276 |
| 3,000 | 3,000 | 590 | 650 | 410 | 390 |
| 4,000 | 4,000 | 720 | 780 | 490 | 480 |
| 5,000 | 5,000 | 800 | 930 | 550 | 540 |

| BRIGHTNESS VALUE OF DISPLAY SECTION (cd/m2) | BRIGHTNESS RATIO | | | |
|---|---|---|---|---|
| | MARBLE | WOOD-GRAIN (YELLOW) | WOOD-GRAIN (BROWN) | METAL HAIRLINE |
| 500 | 0.1 | 0.2 | 0.3 | 0.6 |
| 1,000 | 0.7 | 0.7 | 1.0 | 1.6 |
| 2,000 | 1.4 | 1.8 | 2.1 | 3.2 |
| 3,000 | 2.5 | 3.0 | 3.4 | 4.9 |
| 4,000 | 3.3 | 3.8 | 4.3 | 6.3 |
| 5,000 | 3.8 | 4.7 | 4.9 | 7.2 |

WOOD-GRAIN (YELLOW)　　　WOOD-GRAIN (BROWN)

DISPLAY DEVICE

TECHNICAL FIELD

The disclosure relates to a display device. More specifically, the disclosure relates to a screen of a display device while an image is not displayed.

BACKGROUND ART

Mobile devices, such as mobile phones and notebook computers, are constituted by housings having various colors, such as red and white, or housings having various designs. However, it is hard to say that screens of display devices, such as liquid crystal displays and organic EL displays, are in harmony with designs of housings of the display devices, because, while an image is not displayed, the screens become black screens due to polarizers attached to surfaces of the screens.

In view of the above, Patent Literature 1 discloses an electrochromic mirror which is provided on a front surface of an image display device. According to the image display device, in a case where an image is not displayed on a screen, the electrochromic mirror is caused to function as a mirror, by increasing a reflectance of the electrochromic mirror (i.e., a transmittance of the electrochromic mirror is decreased). Furthermore, according to the image display device, in a case where an image is displayed on the screen, the transmittance of the electrochromic mirror is increased (the reflectance is decreased), and the image is displayed without attenuating a brightness of the image display device.

CITATION LIST

Patent Literature

[Patent Literature 1] Japanese Translation of PCT International Application, Tokuhyo, No. 2009-529452 (published on Aug. 20, 2009)

SUMMARY

Technical Problem

As has been described, according to a display device such as a liquid crystal display or an organic EL display, a screen of the display device becomes a black screen while an image is not displayed. In a case where a television set, a monitor, or the like including such a display device is placed in, for example, a room having a white wall, the black screen is conspicuous while an image is not displayed, so that the screen may not be in harmony with a color of the wall of the room, a color of furniture, or the like.

There is a technique of harmonizing a screen of a display with a housing of the display or an environment surrounding the display by (i) providing the electrochromic mirror disclosed in Patent Literature 1, a half mirror, or the like on a front surface of the display and (ii) causing the screen not to become a black screen but to function as a mirror while an image is not displayed. However, the screen which reflects, as a mirror, the environment surrounding the display is not completely blended with surroundings.

An aspect of the disclosure has been made in view of the above problem, and a main object of the aspect of the disclosure is to provide a technique which allows a screen of a display device to be in harmony with a housing of the display device or an environment surrounding the display device while an image is not displayed.

Solution to Problem

In order to attain the above object, a display device in accordance with an aspect of the disclosure is a display device including: a display section which displays an image; and a background section which is provided on a front surface side of the display section, the background section having a plurality of openings through which light, emitted from the display section for display of the image, passes.

Advantageous Effects of Invention

According to an aspect of the disclosure, it is possible to harmonize a screen of a display device with a housing of the display device or an environment surrounding the display device while an image is not displayed.

BRIEF DESCRIPTION OF DRAWINGS (a) of FIG. 1 is a view schematically illustrating a configuration of a display device in accordance with Embodiment 1 of the disclosure. (b) of FIG. 1 is a view illustrating (i) a pixel included in a display section and (ii) part of a back surface of a background section which part corresponds to the pixel.

FIG. 2 is a table showing a result of examination carried out with use of the display device in accordance with Embodiment 1 of the disclosure.

DESCRIPTION OF EMBODIMENTS

Figures 3, 4, 5:
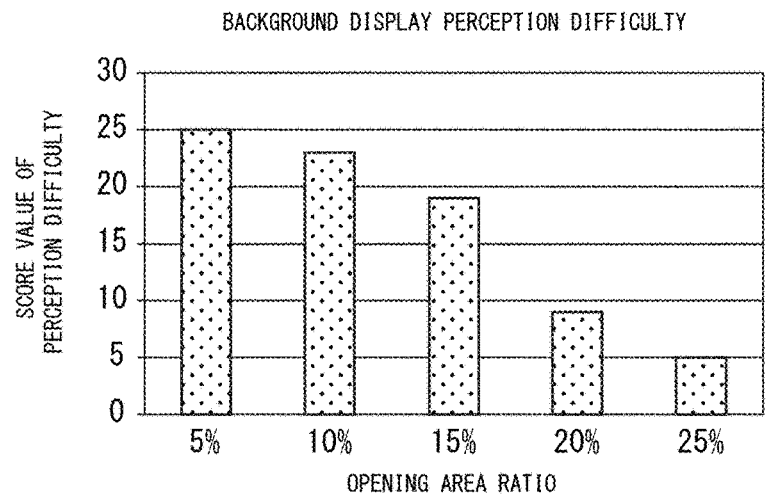
FIG. 3 is a graph showing the result of the examination carried out with use of the display device in accordance with Embodiment 1 of the disclosure.
FIG. 4 is a table showing a result of second examination carried out with use of the display device in accordance with Embodiment 1 of the disclosure.
FIG. 5 is a table showing the result of the second examination carried out with use of the display device in accordance with Embodiment 1 of the disclosure.

The following description will discuss embodiments of the disclosure in detail. Note, however, that, unless otherwise specified, configurations discussed in the embodiments should not be construed as limiting the scope of the disclosure, and are illustrative only.

Embodiment 1

A display device 1 in accordance with Embodiment 1 will be described below with reference to FIG. 1. (a) of FIG. 1 is a view schematically illustrating a configuration of the display device 1 in accordance with Embodiment 1 of the disclosure. (b) of FIG. 1 illustrates (i) one of pixels included in a display section 2 and (ii) one of a plurality of openings 4 formed in a background section 3, the one of the plurality of openings 4 corresponding to the one of the pixels. As illustrated in (a) of FIG. 1, the display device 1 includes the display section 2 and the background section 3 which is provided on a front surface side of the display section 2. The display section 2 is constituted by a display panel 5 and a backlight 6.

Further, as illustrated in (a) of FIG. 1, the display section 2 and the background section 3 are provided so as to be superposed as viewed from above. The background section 3 has the plurality of openings 4 through which light, emitted from the display section 2 for display of an image, passes. As illustrated in (b) of FIG. 1, in the background section 3 which is provided so as to be superposed on the display section 2 as viewed from above, each of the plurality of openings 4 is formed for a corresponding one of the pixels which are included in the display section 2.

According to Embodiment 1, an example will be described in which each of the plurality of openings 4 is formed for a corresponding one of the pixels which are included in the display section 2. However, the disclosure is not limited to such an example. Alternatively, each of the plurality of openings 4 can be formed for corresponding adjacent ones of the pixels which are included in the display section 2. Alternatively, a plurality of openings can be formed in a dispersed manner for each of the pixels which are included in the display section 2 (a total of respective sizes of the plurality of openings is equivalent to a size of one of the plurality of openings 4). Alternatively, in a case where each of the pixels which are included in the display section 2 is constituted by, for example, a red picture element, a green picture element, and a blue picture element, an opening can be formed for each of those picture elements. In this case, a total of (i) a size of the opening corresponding to the red picture element, (ii) a size of the opening corresponding to the green picture element, and (iii) a size of the opening corresponding to the blue picture element is equivalent to the size of one of the plurality of openings 4.

In the display section 2, an image is displayed in such a manner that (i) the backlight 6 emits light toward the display panel 5 which is of a non-light-emitting type and (ii) the display panel 5 which is of a non-light-emitting type controls how much of the light from the backlight 6 should be guided to user's eyes. According to Embodiment 1, an example will be described in which the display panel 5 which is of a non-light-emitting type is employed. However, the disclosure is not limited to such an example. Alternatively, a display panel which is of a self-light-emitting type can be employed. Note that, in a case where the display panel which is of a self-light-emitting type is employed, the backlight 6 is not necessary. As such, the display section 2 is constituted by the display panel which is of a self-light-emitting type. Examples of the display panel which is of a self-light-emitting type include an organic EL display, a plasma display, and an LED display. Examples of the display panel 5 which is of a non-light-emitting type include a liquid crystal display and an MEMS display. In Embodiment 1, a liquid crystal display is employed as the display panel 5 which is of a non-light-emitting type.

A front surface, other than the plurality of openings 4, of the background section 3 is preferably decorated. Note that the front surface is a surface of the background section 3 which surface is exposed to a user side and which surface is opposite from a back surface of the background section 3. Note that the back surface is a surface of the background section 3 which surface faces a display surface of the display panel 5 that is of a non-light-emitting type. According to Embodiment 1, the background section 3 is constituted by a plastic base material made of PET, PC, COP, COC, PI, or the like, and is a decorated film obtained by printing various colors or designs on a surface of the plastic base material by screen printing, ink jet printing, or the like. Note that each of the plurality of openings 4 is a hole which passes through the background section 3 from the back surface of the background section 3 to the front surface of the background section 3, and is not subjected to printing. This allows light from the display section 2 to pass through the plurality of openings 4. Examples of a design of the decorated film include a wood-grain design, a marble design, and a mirror design.

A decorated part of the background section 3, which decorated part is part of the front surface of the background section 3 on which part various colors or designs are printed, blocks light from the display section 2 so that the light does not reach user's eyes. That is, a material and a thickness of the plastic base material of the background section 3 and/or the various colors or designs printed on the front surface of the background section 3 need to be selected so that light from the display section 2 is blocked. Meanwhile, the plurality of openings 4 formed in the background section 3 cause the light from the display section 2 to pass therethrough as it is.

According to Embodiment 1, an example will be described in which the background section 3 is constituted by the decorated film alone. However, the disclosure is not limited to such an example. Alternatively, the background section 3 can be constituted by the decorated film and a transparent acrylic plate having a surface to which the decorated film is attached. Alternatively, the background section 3 can be constituted by the decorated film and a transparent glass having a surface to which the decorated film is attached. Alternatively, the background section 3 can be one that is obtained by integrating the decorated film and a transparent resin by a film insert molding or the like. Alternatively, the background section 3 can be constituted, not by the decorated film, but by a decorated glass having a surface on which various colors or designs are printed.

Note that, in any of (i) a case where the background section 3 is constituted by the decorated film and the transparent acrylic plate, (ii) a case where the background section 3 is constituted by the decorated film and the transparent glass, and (iii) a case where the background section 3 is one that is obtained by integrating the decorated film and the transparent resin, a decorated part of the decorated film blocks light from the display section 2 so that the light does not reach user's eyes, and a plurality of openings formed in the decorated film cause the light from the display section 2 to pass therethrough as it is.

In a case where the background section 3 is constituted, not by the decorated film, but by the decorated glass having a surface on which various colors or designs are printed, a decorated part of the decorated glass blocks light from the display section 2 so that the light does not reach user's eyes, and a plurality of openings (that is, non-decorated part) formed in the decorated glass cause the light from the display section 2 to pass therethrough.

As used herein, an opening means a hole which passes through the decorated film from a back surface of the decorated film to a front surface of the decorated film, and also means a region of a film, a glass, a resin, and the like which region causes light to pass therethrough.

(Examination of Ratio of Area of Opening 4)

A function, in terms of a design, of the display device 1 while an image is not displayed is dependent on an opening area ratio, which is a ratio of an area of each of the plurality of openings 4 to an area of a corresponding one of the pixels which are included in the display section 2. Thus, a relationship between the opening area ratio and such a design function of a display device was examined with use of a plurality of display devices which differed from each other only in opening area ratio. Note that the area of each of the plurality of openings indicates a total area of an opening(s) formed in a region of the background section 3 which region overlaps, as viewed from above, the corresponding one of the pixels that are included in the display section 2. Results of the above examination will be explained below with reference to FIGS. 2 and 3.

In the examination, subjects A through E were asked to (i) observe screens of the plurality of display devices having respective opening area ratios, while an image was not displayed and (ii) evaluate (subjective evaluation) whether the subjects A through E perceived each of the screens of the plurality of display devices as a black screen. Each of the subjects carried out evaluation on a scale of 1 to 5, where: 1 indicates a case where the each of the subjects perceived a screen of a display device as a black screen; and 5 indicates a case where the each of the subjects did not perceive a screen of a display device as a black screen. FIG. 2 is a table showing the opening area ratios and totals of values given as a result of the evaluation by the subjects A through E. FIG. 3 is a graph obtained by plotting the opening area ratios (horizontal axis) and the totals of the values given as a result of the evaluation by the subjects A through E (vertical axis (score values of perception difficulty)).

As shown in FIGS. 2 and 3, a score value for a display device having an opening area ratio of 5% was 25, and a score value for a display device having an opening area ratio of 10% was 23. A score value for a display device having an opening area ratio of 15% was 19. A score value for a display device having an opening area ratio of 20% was 9. A score value for a display device having an opening area ratio of 25% was 5.

In summary, the above examination showed a result that, as the opening area ratio is increased, a black screen, which is a screen of the display section 2 that is provided on the back surface of the background section 3, is more perceived. It is generally said that a display brightness of 400 cd/m² to 500 cd/m² is sufficient for viewing indoors. From the examination, it was found that the opening area ratio is preferably as low as possible so that the black screen is not perceived while the display section 2, which is provided on the back surface of the background section 3, does not display an image. However, in a case where the opening area ratio is 5%, light from the display section 2 which is provided on the back surface of the background section 3 needs to have a brightness value of approximately 8,000 cd/m² to 10,000 cd/m² so that, while the display section 2 displays an image, a brightness of the image, which is displayed by the display section 2 and which has passed through the plurality of openings 4 formed in the background section 3, reaches 400 cd/m² to 500 cd/m². However, it is not practical to cause the display section 2 to have such a high brightness, from the viewpoint of consumed electric power and shortening of a life of the display section 2.

In a case where the opening area ratio is 10%, light from the display section 2 which is provided on the back surface of the background section 3 needs to have a brightness value of approximately 4,000 cd/m² to 5,000 cd/m² so that, while the display section 2 displays an image, a brightness of the image, which is displayed by the display section 2 and which has passed through the plurality of openings 4 formed in the background section 3, reaches 400 cd/m² to 500 cd/m². Therefore, it is practical to cause the display section 2 to have such a brightness.

As has been described, from the viewpoint of difficulty of perceiving the black screen while the display section 2, which is provided on the back surface of the background section 3, does not display an image, the opening area ratio is preferably not more than 15% at which a score value of perception difficulty is not less than 19. From the viewpoint of an increase in brightness of the display section 2, the opening area ratio is preferably not less than 10%.

Therefore, the opening area ratio is preferably approximately 10% to 15%.

(Examination of Brightness Ratio Between Transmission Brightness and Background Brightness)

According to a liquid crystal display, an organic EL display, or the like in the conventional technique, a member, such as a polarizer, which suppresses reflection of external light is provided so as to be located at the forefront of a display. According to the display device 1 in accordance with Embodiment 1, the background section 3 is provided so as to be located at the front of the display device 1. Therefore, it is not possible to ignore a background brightness which is a brightness of background light that occurs by light (environment light) in an environment surrounding the display device 1, that is, external light being reflected by a surface of the background section 3. Note that the background brightness indicates a brightness of background light which occurs by external light being reflected by the surface of the background section 3, while the display section 2 does not display an image (while a brightness value of the display section 2 is 0 cd/m²).

It is generally said that a brightness ratio $B_r$ between a transmission brightness $(B_d - B_n)$, which is a brightness of an object to be viewed by a user, and a background brightness $B_n$, which is a brightness of surroundings as described above, is represented by the following Expression (A) and that, in a case where the brightness ratio is approximately not less than 4, the user can view the object with good visibility.

$$B_r = (B_d - B_n)/B_n \tag{A}$$

Note, here, that $B_d$ represents a brightness of the surface of the background section 3 while the display section 2 displays an image. Since $B_d$ includes both (i) a brightness of the image which is displayed by the display section 2 and which has passed through the plurality of openings 4 formed in the background section 3 and (ii) the background brightness $B_n$ which is a brightness of background light that occurs by external light being reflected by the background section 3, the background brightness $B_n$ is subtracted from a value of $B_d$ so as to calculate the transmission brightness $(B_d - B_n)$ which indicates the brightness of the image which is displayed by the display section 2 and which has passed through the plurality of openings 4 formed in the background section 3.

According to the above Expression (A), the brightness value of the display section 2 which is provided on the back surface of the background section 3 tends to be required to be higher than the above-described 4000 cd/m² to 5,000 cd/m² so that a condition that the brightness ratio $B_r$ is approximately not less than 4 is satisfied. In view of that, it is considered to decrease the background brightness $B_n$ so as to cause the brightness ratio $B_r$ represented by the above Expression (A), to be approximately not less than 4 without increasing the brightness value of the display section 2.

A reflectance of the background section 3 varies depending on a design of the surface of the background section 3. As such, in a case where the reflectance of the background section 3 is increased, the background brightness $B_n$ is increased. Therefore, it is necessary that the brightness value of the display section 2 be a higher value, in order to cause the brightness ratio $B_r$ to be approximately not less than 4. In a case where the reflectance of the background section 3 is decreased, the background brightness $B_n$ is decreased. Therefore, it is possible to decrease the brightness value of the display section 2 which brightness value is required so as to cause the brightness ratio $B_r$ to be approximately not less than 4.

In view of that, what brightness value the display section 2 needs to have was examined, under an office fluorescent lamp (1000 lx) with use of the display device 1 in which each of four types of decorated films was attached, as the background section 3, to a surface of the display section 2. As the four types of decorated films, a decorated film having a marble design, a decorated film having a wood-grain design (yellow), a decorated film having a wood-grain design (brown), and a decorated film having a metal hairline design were used. In examination, brightness values on respective surfaces of the four types of decorated films (background section 3) were measured each time the brightness value of the display section 2 was varied.

FIG. 4 is a table showing a relationship between the brightness value of the display section 2 and a brightness value on the surface of the background section 3 (decorated film surface brightness values), the relationship being obtained in regard to each of the four types of decorated films.

In FIG. 4, in a case where the brightness value of the display section 2 is 0 cd/m² (in a case where the display section 2 does not display an image), the brightness value on the surface of the background section 3 (decorated film surface brightness value) indicates the above-described background brightness $B_n$. In a case where the brightness value of the display section 2 is a value other than 0 (500 cd/m², 1000 cd/m², 2000 cd/m², 3000 cd/m², 4000 cd/m², and 5000 cd/m²), the brightness value on the surface of the background section 3 indicates the above-described brightness $B_d$ of the surface of the background section 3 while the display section 2 displays an image.

Figure 6:
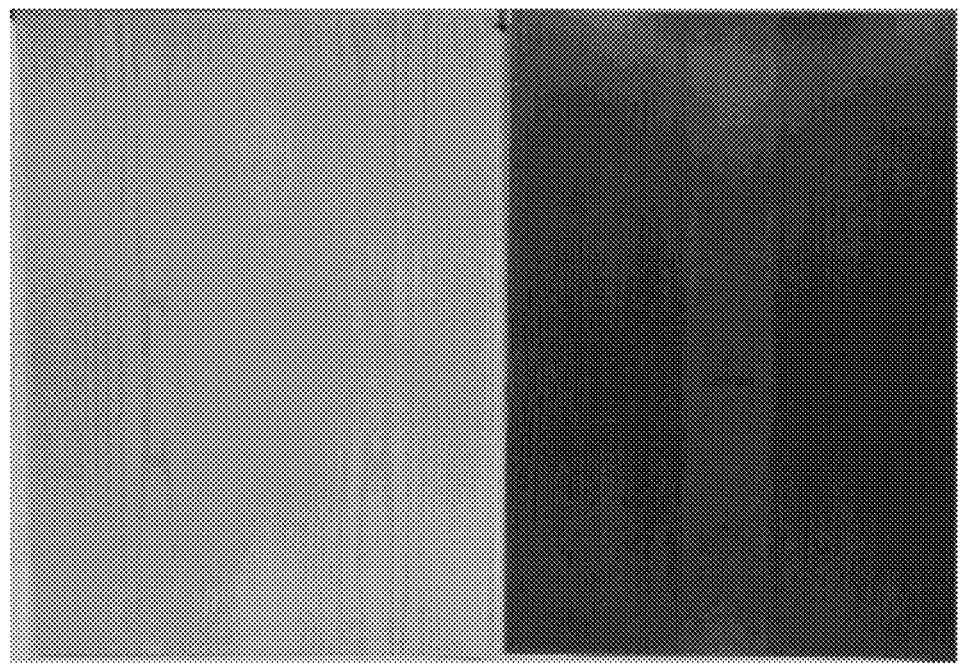
FIG. 6 is an image illustrating designs of a background section, which designs were used for the second examination of the display device in accordance with Embodiment 1 of the disclosure.

FIG. 5 is a table showing a relationship between the brightness value of the display section 2 and the above-described brightness ratio $B_r$, the relationship being obtained in regard to each of the four types of decorated films. FIG. 6 is a view illustrating the wood-grain design (yellow) and the wood-grain design (brown) which were actually used in the examination.

In measurement as shown in FIGS. 4 and 5, appearance of a screen of the display device 1 was evaluated (subjective evaluation) at the same time. As a result, as has been described, it was confirmed that, in a case where the brightness ratio $B_r$ is approximately not less than 4, visibility is considerably increased. Furthermore, even in a case where the brightness ratio $B_r$ was not less than 3.5, good visibility was obtained.

As shown in FIG. 5, it is found that, in a case where the background section 3 has the marble design, good visibility can be achieved when the brightness value of the display section 2 is approximately not less than 5000 cd/m². It is also found that, in a case where the background section 3 has the wood-grain design (yellow), good visibility can be achieved when the brightness value of the display section 2 is approximately not less than 4000 cd/m². It is also found that, in a case where the background section 3 has the wood-grain design (brown), good visibility can be achieved when the brightness value of the display section 2 is approximately not less than 4000 cd/m². It is also found that, in a case where the background section 3 has the metal hairline design, good visibility can be achieved when the brightness value of the display section 2 is approximately not less than 3000 cd/m².

Summary of Embodiment 1

As has been described, the display device 1 in accordance with Embodiment 1 includes the background section 3 which is provided on the front surface side of the display section 2, and the background section 3 has a plurality of openings through which light, emitted from the display section 2 for display of an image, passes. In a case where the display section 2 displays an image, light, for display of the image, passes through the plurality of openings. Therefore, it is possible for a user to view the image as usual. In a case where the display section 2 does not display an image, the user does not see a black screen but sees the surface of the background section 3 because the surface of the background section 3 is located at the forefront of the display device 1. Therefore, by selecting, as appropriate, the background section 3 to be used, it is possible to harmonize the screen of the display device 1 with a housing of the display device 1 or an environment surrounding the display device 1 while an image is not displayed.

Further, the front surface, other than the plurality of openings, of the background section 3 is preferably decorated. This makes it possible to harmonize a screen of the display section 2 with the housing of the display device 1 or the environment surrounding the display device 1 while an image is not displayed.

In Patent Literature 1, the electrochromic mirror is provided on the front surface of the image display device, and the electrochromic mirror is caused to function as a mirror. This configuration has the following problem. That is, according to this configuration, a driving circuit for the electrochromic mirror is required, in addition to a driving circuit for the image display device. This causes an increase in circuit scale, and ultimately causes an increase in cost. Moreover, the image display device can be used only as a mirror, while an image is not displayed.

However, according to the display device 1 in accordance with Embodiment 1, it is only necessary to provide the background section 3 on the front surface of the display section 2. This results in low cost. Furthermore, according to the display device 1 in accordance with Embodiment 1, it is possible to select the background section 3 as appropriate. Therefore, it is possible to find a use application (for example, design) other than a mirror.

The display device 1 in accordance with Embodiment 1 can have a shape other than a general shape such as a square shape or a rectangular shape, as viewed from the front. Examples of such a shape include a circular shape, an elliptical shape, and a trapezoidal shape.

Furthermore, the display device 1 in accordance with Embodiment 1 can be a curved display having a curvature in whole. A shape of the curved display can be a shape protruding with respect to a front side or can be alternatively a shape depressed with respect to the front side. Alternatively, the shape of the curved display can be a spherical shape or can be alternatively a hemispheric shape.

By causing the display device in accordance with Embodiment 1 to have a shape as listed above as an example, it is possible to more harmonize the display device with the environment surrounding the display device.

Embodiment 2

Figure 7:
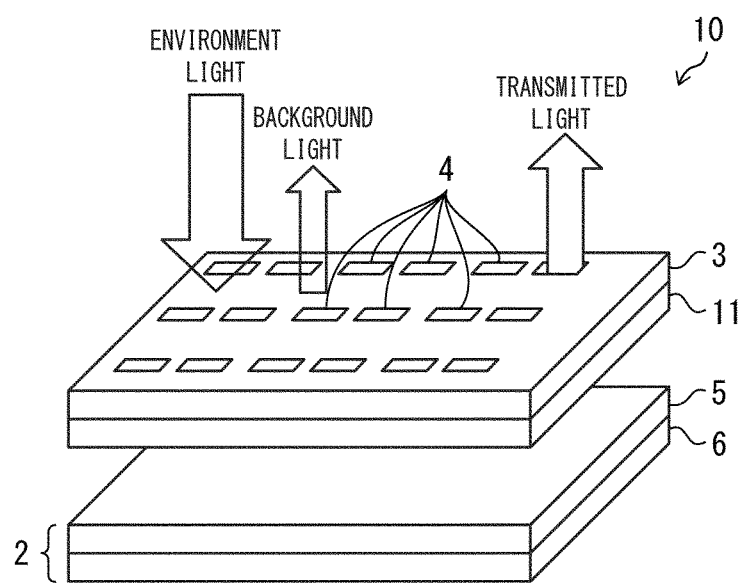
FIG. 7 is a view schematically illustrating a configuration of a display device in accordance with Embodiment 2 of the disclosure.

The following description will discuss Embodiment 2 of the disclosure with reference to FIG. 7. Note that, for convenience, a member having a function identical to that of a member described in Embodiment 1 will be given an identical reference sign and will not be described below.

A display device 10 in accordance with Embodiment 2 will be described below with reference to FIG. 7. FIG. 7 is a view schematically illustrating a configuration of the display device 10 in accordance with Embodiment 2. As illustrated in FIG. 7, in addition to the configuration of the display device 1 in accordance with Embodiment 1, the display device 10 includes a touch panel 11 which is provided between a background section 3 and a display section 2.

The touch panel 11 detects a touch made by a user on a screen (surface of the background section 3) of the display device 10. The display device 10 then controls, for example, display of an image, depending on such a detection made by the touch panel 11.

In a case where the background section 3 is constituted by a decorated film, the touch panel 11 can be attached to a back surface of the decorated film via an OCA (Optical Clear Adhesive). Note that an air gap can be provided between the touch panel 11 and the display section 2 which is provided on a back side of the touch panel 11. Alternatively, an OCA or the like can be provided between the touch panel 11 and the display section 2.

The touch panel 11 can be provided on a surface of the display section 2 by an on-cell structure as illustrated in FIG. 7. Alternatively, the display section 2 can have a touch panel function by an in-cell structure (not illustrated).

As has been described, the display device 10 in accordance with Embodiment 2 includes the touch panel 11 which is provided between the background section 3 and the display section 2. This allows a user to operate the display device 10 merely by touching the surface of the background section 3 which surface is located at the forefront of the display device 10. Further, the following usage can be also considered. That is, for example, (i) the background section 3 having the surface on which a figure, such as a button, is printed is employed, (ii) the touch panel 11 is brought into operation while the display section 2 of the display device 10 is not brought into operation, and (iii) a user operates the display device 10 by pressing the button.

Embodiment 3

Figure 8:
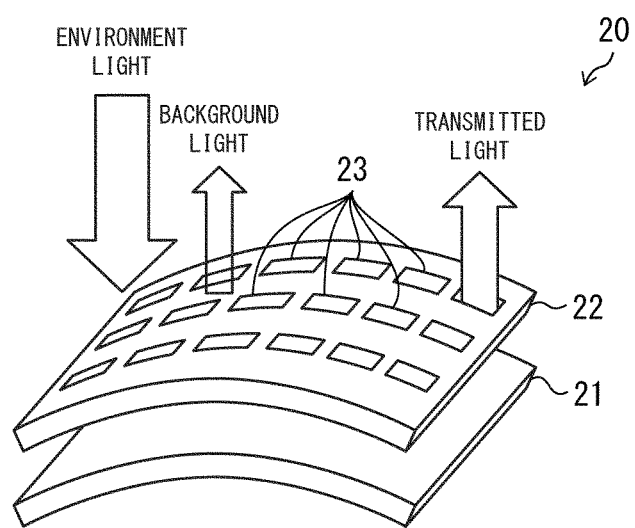
FIG. 8 is a view schematically illustrating a configuration of a display device in accordance with Embodiment 3 of the disclosure.

The following description will discuss Embodiment 3 of the disclosure with reference to FIG. 8. Note that, for convenience, a member having a function identical to that of a member described in Embodiment 1 will be given an identical reference sign and will not be described below.

A display device 20 in accordance with Embodiment 3 includes a display section 21 which is flexible, instead of the display device 2, which includes the backlight 6, of the display device 1 in accordance with Embodiment 1.

The display section 21 in accordance with Embodiment 3 has a function similar to that of the display section 2 in accordance with Embodiment 1. However, the display section 21 is bendable (flexible). As such, it is possible to bend the display section 21 any number of times. Examples of the display section 21 which is flexible include an organic EL display and a reflective liquid crystal display which does not include a backlight. It is preferable that a background section 22, having openings 23, in accordance with Embodiment 3 be a decorated film which is attached to a plastic resin that is bendable or be alternatively a decorated film itself as described above, from the viewpoint of ensuring flexibility. According to the above configurations, it is possible to flexibly bend the display device 20 in accordance with Embodiment 3 any number of times.

[Recap]

A display device (1, 10, 20) in accordance with Aspect 1 of the disclosure is a display device including: a display section (2, 21) which displays an image; and a background section (3, 22) which is provided on a front surface side of the display section, the background section having a plurality of openings (4, 23) through which light, emitted from the display section for display of the image, passes.

According to the above configuration, a user does not see a black screen but sees a surface of the background section because the surface of the background section is located at the forefront of the display device. Therefore, by selecting, as appropriate, the background section to be used, it is possible to harmonize a screen of the display device with a housing of the display device or an environment surrounding the display device while an image is not displayed.

The display device (1, 10, 20) in accordance with Aspect 2 of the disclosure can be arranged such that, in Aspect 1, each of the plurality of openings is provided for a corresponding one of pixels which are included in the display section, for a corresponding one of picture elements which constitute each of the pixels, or for corresponding adjacent ones of the pixels.

According to the above configuration, it is possible for a user to view the image, displayed by the display section, through the plurality of openings formed in the background section.

The display device (1, 10, 20) in accordance with Aspect 3 of the disclosure can be arranged such that, in Aspect 2, a ratio of an area of the each of the plurality of openings to an area of the corresponding one of the pixels which are included in the display section, the corresponding one of the picture elements which constitute the each of the pixels, or the corresponding adjacent ones of the pixels is 10% to 15%.

According to the above configuration, while the display section does not display the image, the black screen is not perceived. Furthermore, it is possible to sufficiently ensure a brightness of light passing through the plurality of openings to such a degree that the image is viewed even in a case where a brightness value of the display section is not increased more than necessary.

The display device (1, 10, 20) in accordance with Aspect 4 of the disclosure can be arranged such that, in Aspects 1 through 3, a brightness ratio $B_r$ is not less than 3.5, the brightness ratio $B_r$ being calculated by the following Expression (A):

$$B_r = (B_d - B_n)/B_n \quad (A)$$

where: $B_d$ represents a brightness while the display section displays the image, the brightness including both (i) a brightness of the image which is displayed by the display section and which has passed through the plurality of openings formed in the background section and (ii) a brightness of a surface of the background section which brightness is based on external light; and $B_n$ represents the brightness of the surface of the background section which brightness is based on the external light, while the display section does not display the image.

According to the above configuration, the image displayed by the display section is viewed with good visibility.

The display device (1, 10, 20) in accordance with Aspect 5 of the disclosure can be arranged such that, in Aspects 1 through 4, a front surface, other than the plurality of openings, of the background section is decorated.

According to the above configuration, it is possible to more harmonize the screen with the housing or the environment surrounding the display device, while the image is not displayed, by decorating the front surface, other than the plurality of openings, of the background section with a suitable design.

The display device (10) in accordance with Aspect 6 of the disclosure can be arranged so as to, in Aspects 1 through 5, further include a touch panel (11) which is provided between the background section and the display section.

According to the above configuration, it is possible for a user to operate the display device merely by touching the surface of the background section which surface is located at the forefront of the display device.

The display device (20) in accordance with Aspect 7 of the disclosure can be arranged such that, in Aspects 1 through 6, each of the display section and the background section is bendable.

According to the above configuration, it is possible to flexibly bend the display device any number of times.

The display device (20) in accordance with Aspect 8 of the disclosure can be arranged such that, in Aspect 7, the display section is an organic EL display or a reflective liquid crystal display.

According to the above configuration, it is possible to bring about an effect similar to that brought about by the display device in accordance with Aspect 7.

The display device (1, 10, 20) in accordance with Aspect 9 of the disclosure can be arranged such that, in Aspects 1 through 8, each of the display section and the background section has a circular shape, an elliptical shape, a trapezoidal shape, a curved shape, a hemispherical shape, or a spherical shape.

According to the above configuration, it is possible to more harmonize the display device with the environment surrounding the display device.

The disclosure is not limited to the embodiments, but can be altered by a skilled person in the art within the scope of the claims. The disclosure also encompasses, in its technical scope, any embodiment derived by combining technical means disclosed in differing embodiments. Further, it is possible to form a new technical feature by combining the technical means disclosed in the respective embodiments.

The display device (1, 10, 20) in accordance with Aspect 10 of the disclosure is arranged such that, in Aspects 1 through 9, the background section is a decorated film; and the decorated film has, as the plurality of openings, holes which pass through the decorated film.

According to the above configuration, it is possible to produce the display device in accordance with Aspects 1 through 9 merely by attaching the decorated film to the display section. This allows a reduction in cost.

The display device (1, 10, 20) in accordance with Aspect 11 of the disclosure is arranged such that, in Aspects 1 through 9, the background section includes a transparent substrate and a decorated film which is provided on the transparent substrate; and the decorated film has, as the plurality of openings, holes which pass through the decorated film.

According to the above configuration, since the decorated film is provided on the transparent substrate, it is possible to increase strength of the decorated film.

The display device (1) in accordance with Aspect 12 of the disclosure can be arranged such that, in Aspects 1 through 5, the background section includes a transparent glass substrate and a decorated film which is provided on the transparent glass substrate; and the decorated film has, as the plurality of openings, holes which pass through the decorated film.

According to the above configuration, since the decorated film is provided on the transparent glass substrate, it is possible to increase strength of the decorated film.

The display device (1, 10, 20) in accordance with Aspect 13 of the disclosure can be arranged such that, in Aspects 1 through 9, the background section is a resin layer which is obtained by coating a decorated film with a transparent resin; and the decorated film has, as the plurality of openings, holes which pass through the decorated film.

According to the above configuration, since the decorated film is coated with the transparent resin, it is possible to protect the decorated film.

The display device (1) in accordance with Aspect 14 of the disclosure can be arranged such that, in Aspects 1 through 5, the background section is a decorated glass; and the decorated glass has, as the plurality of openings, a non-decorated part through which the light, emitted from the display section for the display of the image, passes.

According to the above configuration, since a glass is directly decorated, it is possible to increase strength of the decorated part.

REFERENCE SIGNS LIST

1, 10, 20 Display device
2, 21 Display section
3, 22 Background section
4 Opening
5 Display panel
6 Backlight
11 Touch panel
23 Opening

The invention claimed is:

1. A display device comprising:
   a display section which displays an image; and
   a background section which is provided on a front surface side of the display section,
   the background section having a plurality of openings through which light, emitted from the display section for display of the image, passes,
   wherein a brightness ratio $B_r$ is not less than 3.5, the brightness ratio $B_r$ being calculated by the following Expression (A):

$$B_r = (B_d - B_n)/B_n \quad (A)$$

where:
   $B_d$ represents a brightness while the display section displays the image, the brightness including both (i) a brightness of the image which is displayed by the display section and which has passed through the plurality of openings formed in the background section and (ii) a brightness of a surface of the background section which brightness is based on external light; and
   $B_n$ represents the brightness of the surface of the background section which brightness is based on the external light, while the display section does not display the image.

2. The display device as set forth in claim 1, wherein each of the plurality of openings is provided for a corresponding one of pixels which are included in the display section, for a corresponding one of picture elements which constitute each of the pixels, or for corresponding adjacent ones of the pixels.

3. The display device as set forth in claim 2, wherein a ratio of an area of the each of the plurality of openings to an area of the corresponding one of the pixels which are included in the display section, the corresponding one of the picture elements which constitute the each of the pixels, or the corresponding adjacent ones of the pixels is 10% to 15%.

4. The display device as set forth in claim 1, wherein a front surface, other than the plurality of openings, of the background section is decorated.

5. The display device as set forth in claim 1, further comprising a touch panel which is provided between the background section and the display section.

6. The display device as set forth in claim 1, wherein each of the display section and the background section is bendable.

7. The display device as set forth in claim 6, wherein the display section is an organic EL display or a reflective liquid crystal display.

8. The display device as set forth in claim 1, wherein each of the display section and the background section has a circular shape, an elliptical shape, a trapezoidal shape, a curved shape, a hemispherical shape, or a spherical shape.

9. The display device as set forth in claim 1, wherein:
the background section is a decorated film; and
the decorated film has, as the plurality of openings, holes which pass through the decorated film.

10. The display device as set forth in claim 1, wherein:
the background section includes a transparent substrate and a decorated film which is provided on the transparent substrate; and
the decorated film has, as the plurality of openings, holes which pass through the decorated film.

11. The display device as set forth in claim 1, wherein:
the background section includes a transparent glass substrate and a decorated film which is provided on the transparent glass substrate; and
the decorated film has, as the plurality of openings, holes which pass through the decorated film.

12. The display device as set forth in claim 1, wherein:
the background section is a resin layer which is obtained by coating a decorated film with a transparent resin; and
the decorated film has, as the plurality of openings, holes which pass through the decorated film.

13. The display device as set forth in claim 1, wherein:
the background section is a decorated glass; and
the decorated glass has, as the plurality of openings, a non-decorated part through which the light, emitted from the display section for the display of the image, passes.

* * * * *